(12) United States Patent
Nakajima

(10) Patent No.: US 7,075,688 B2
(45) Date of Patent: Jul. 11, 2006

(54) MULTIBEAM SCANNING APPARATUS

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/878,575

(22) Filed: Jun. 29, 2004

(65) Prior Publication Data
US 2004/0239752 A1 Dec. 2, 2004

Related U.S. Application Data

(62) Division of application No. 09/552,657, filed on Apr. 19, 2000, now Pat. No. 6,775,041.

(30) Foreign Application Priority Data
Apr. 20, 1999 (JP) .................................. 11-111613

(51) Int. Cl.
*G02B 26/08* (2006.01)
(52) U.S. Cl. ...................... 359/204; 359/216
(58) Field of Classification Search .............. None
See application file for complete search history.

(56) References Cited

U.S. PATENT DOCUMENTS

| 5,610,647 A | 3/1997 | Takada |
| 5,633,744 A | 5/1997 | Nakajima |
| 5,671,077 A | 9/1997 | Imakawa et al. |
| 5,753,907 A | 5/1998 | Nakajima et al. |
| 5,786,594 A | 7/1998 | Ito et al. |
| 5,793,408 A | 8/1998 | Nakajima |
| 5,930,019 A | 7/1999 | Suzuki et al. |
| 5,936,756 A | 8/1999 | Nakajima |
| 5,970,034 A | 10/1999 | Sakuma et al. |
| 5,999,345 A | 12/1999 | Nakajima et al. |

FOREIGN PATENT DOCUMENTS

| JP | 6-331913 | 12/1994 |
| JP | 10-090616 | 4/1998 |
| JP | 10-213773 | 8/1998 |
| JP | 11-023988 | 1/1999 |

*Primary Examiner*—James Phan
(74) *Attorney, Agent, or Firm*—Oblon, Spivak, McClelland, Maier & Neustadt, P.C.

(57) ABSTRACT

A multibeam scan apparatus includes a light source having semiconductor laser diodes and coupling lenses arranged in a main scan direction. The semiconductor laser diodes are positioned so that light beams emitted by the semiconductor laser diodes substantially cross each other at a point. A light beam restricting unit shapes the light beams from the laser diodes through the coupling lenses so that the light beams have a given spot size. The light beam restricting unit is positioned close to the above-mentioned point. A scan lens causes the light beams reflected by a polygonal mirror to form images on a scanned surface.

8 Claims, 5 Drawing Sheets

FIG. 4
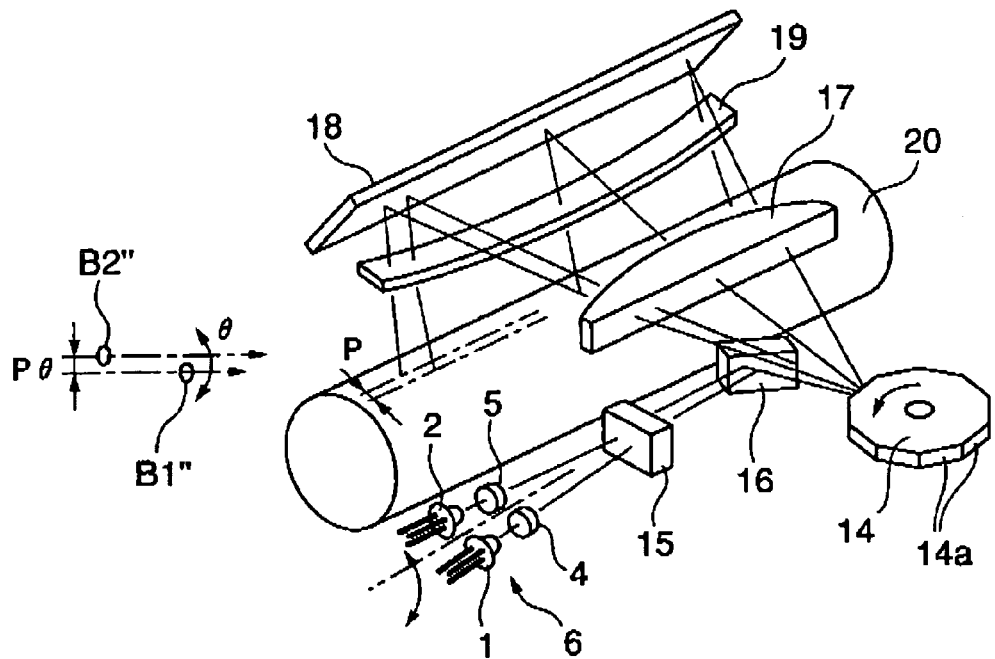
FIG. 5A
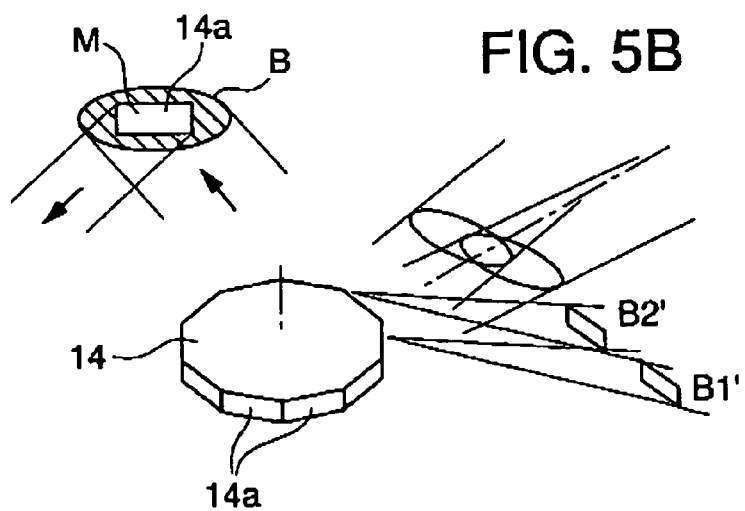
FIG. 5B

MULTIBEAM SCANNING APPARATUS

CROSS-REFERENCE TO RELATED APPLICATIONS

The present application is a Divisional of U.S. application Ser. No. 09/552,657, filed on Apr. 19, 2000 now U.S. Pat. No. 6,775,041, and in turn claims priority to JP 11-111613 filed on Apr. 20, 1999, the entire contents of each of which are hereby incorporated herein by reference.

BACKGROUND OF THE INVENTION

1. Field of the Invention

The present invention relates to an optical scanning apparatus used in a write system of a digital copying machine, a laser beam printing machine or the like. More particularly, the present invention is concerned with a multibeam scanning apparatus capable of simultaneously scanning a scanned surface such as a photosensitive member with multiple light beams so that the recording rate can be increased.

2. Description of the Related Art

Conventionally, a method for increasing the revolution speed of a polygonal mirror is known as means for increasing the recording rate of the optical scanning apparatus used in the write system. However, the above method results in an increased load on a motor for driving the polygonal mirror. The increased load degrades durability of the optical scanning apparatus, and causes noise and vibration. Eventually, improvement in the recording rate is limited.

A multibeam scanning apparatus has been proposed which simultaneously records a plurality of lines with a plurality of light beams formed simultaneously. For example, Japanese Laid-Open Patent Application No. 6-331913 discloses that light beams emitted by a light source made up of a plurality of semiconductor laser diodes are combined by means of a beam splitter. However, the proposed method needs a fine control of the optical axes of the light beams. Such a fine control needs a complex adjustment mechanism and cumbersome adjustment work.

Another multibeam scanning apparatus has been proposed which as a multibeam light source, in which a plurality of semiconductor laser diodes and a coupling lens are incorporated into a module and beams emitted by the laser diodes are made closer to each other and are then combined by a beam combining means. The above multibeam light source has a simple structure that can be assembled with ease, and makes it possible to easily adjust a sub scan pitch.

The above-mentioned method using the laser diodes and the beam splitter has a disadvantage in that a housing or optical components forming the light sources may be deformed due to an environment change. Such a deformation results in a variation in the attitude of the optical unit itself, and a positional displacement between the semiconductor lasers and the coupling lens. Thus, the sub scan pitch on the scanned surface is liable to be varied. The above disadvantage needs a mechanism for measuring the sub scan pitch, and another mechanism for correcting the sub scan pitch based on the sub scan pitch thus measured. Particularly, Japanese Laid-Open Patent Application No. 6-331913 shows a feedback correction in which a prism is used for each beam in order to finely adjust the optical axis and thus cause the light beams to travel in the correct direction. However, such a feedback correction is implemented by a complex structure and is thus expensive.

In contrast, the proposal using the module provides the following advantages. The semiconductor laser diodes and the coupling lens are integrally supported by an identical base member, and the beams are emitted in the main scanning direction at given angular intervals. With the above structure, it is possible to adjust the sub scan pitch by merely adjusting the revolution of the entire light source unit and assemble the apparatus easily. In this regard, the semiconductor laser diodes may be arranged close to each other in order to omit the beam combining means.

However, in any proposal using the modules, the beam emitting positions are offset from the optical axis (rotational axis). Thus, the adjustment of the sub scan pitch varies the beam emitting points, so that the light beams may be inclined. It is thus required to adjust the optical axis with a high precision sufficient to hold down a fine revolution.

SUMMARY OF THE INVENTION

It is an object of the present invention to provide a less-expensive multibeam scanning apparatus having a simple structure which can easily be assembled.

Another object of the present invention is to provide a multibeam scanning apparatus capable of realizing high-rate, high-density recording without increasing the size of the polygonal mirror.

The above objects of the present invention are achieved by a multibeam scan apparatus comprising: a light source having semiconductor laser diodes and coupling lenses arranged in a main scan direction, the semiconductor laser diodes being positioned so that light beams emitted by the semiconductor laser diodes substantially cross each other at a point; a light beam restricting unit shaping the light beams from the laser diodes through the coupling lenses so that the light beams have a given spot size, the light beam restricting unit being positioned close to the point; a polygonal mirror; and a scan lens causing the light beams reflected by the polygonal mirror to form images on a scanned surface.

The above objects of the present invention are also achieved by a multibeam scan apparatus comprising: a light source having a semiconductor laser diode array of light-emitting sources, and a coupling lens, the light-emitting sources being arranged in a main scan direction; a convergent unit causing the light beams to converge in the main scan direction; a light beam restricting unit shaping the light beams so as to have a given spot size, the light beam restricting unit being positioned close to a position at which the light beams cross each other due to a function of the convergent unit; a polygonal mirror; and a scan lens causing the light beams reflected by the polygonal mirror to form images on a scanned surface.

The above objects of the present invention are also achieved by a multibeam scan apparatus comprising: a light source emitting light beams, outgoing beam directions in which the light beams travel being arranged so as to cross each other; a deflection unit deflecting the light beams; and an optical unit causing the light beams from the deflection unit to form images on a scanned surface.

The above-mentioned objects of the present invention are also achieved by a multibeam scan apparatus comprising: a light source having semiconductor laser diodes and coupling lenses arranged in a main scan direction, the semiconductor laser diodes being positioned so that outgoing beam directions in which light beams emitted by the semiconductor laser diodes travel cross each; a deflection unit deflecting the light beams; and an optical unit causing the light beams to form images on a scanned surface.

The above objects of the present invention are also achieved by a multibeam scan apparatus comprising: a light source having a semiconductor laser diode array of light-emitting sources formed in a monolithic formation, and a coupling lens, the light-emitting sources being arranged in a main scan direction; a convergent unit causing the light beams to converge in the main scan direction; a light beam restricting unit shaping the light beams so as to have a given spot size, the light beam restricting unit being positioned close to a position at which the light beams cross each other due to a function of the convergent unit; a deflection unit deflecting the light beams; and a scan lens causing the light beams deflected by the deflection unit to form images on a scanned surface.

BRIEF DESCRIPTION OF THE DRAWINGS

Other objects, features and advantages of the present invention will become more apparent from the following detailed description when read in conjunction with the accompanying drawings, in which:

FIG. 4 is a perspective view of an overall structure of the multibeam scan apparatus according to the first embodiments of the present invention;

FIGS. 5A and 5B are diagrams of an arrangement in which a light beam restricting unit is incorporated into a reflection surface of a polygonal mirror;

DESCRIPTION OF THE PREFERRED EMBODIMENTS

Figure 1:
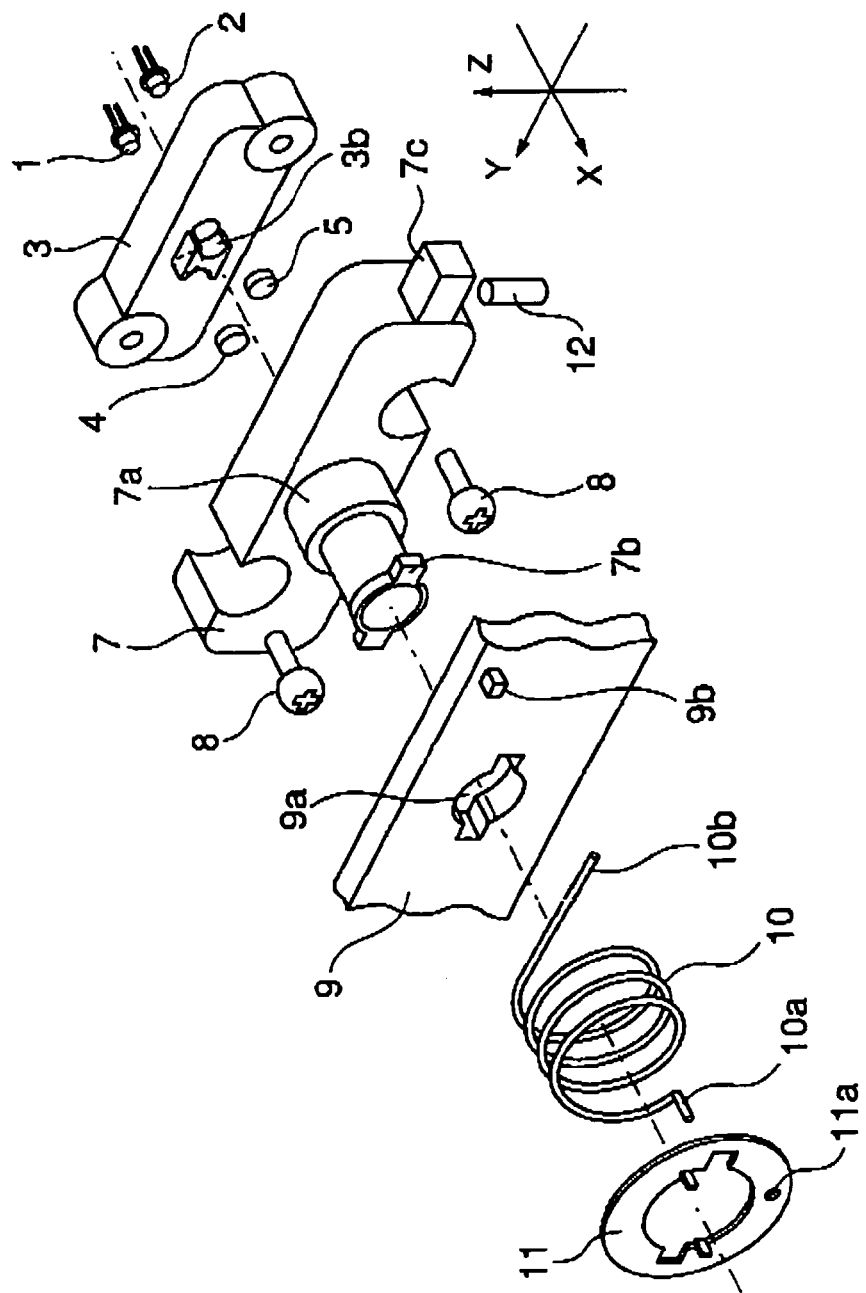
FIG. 1 is an exploded perspective view of a light source of a multibeam scan apparatus according to a first embodiment of the present invention.

A description will now be given, with reference to FIGS. 1 through 5, of a first embodiment of the present invention. FIG. 1 shows a light source of a multibeam scanning apparatus using two semiconductor laser diodes, and FIG. 2 is a cross-sectional view thereof taken along a main scan direction Y shown in FIG. 1.

Referring to FIG. 1, two semiconductor laser diodes 1 and 2 are respectively inserted, with a pressure, into fitting holes 3a and 3b (see FIG. 2) formed on a back side of a base member made of aluminum die-cast and arranged side by side at an interval of 8 mm in the main scan direction Y. The distance of 8 mm allows coupling lenses 4 and 5 to be arranged side by side. The coupling lenses 4 and 5 are placed into holes integral with the fitting holes 3a and 3b, and are fixed therein by UV hardening resin. The coupling lenses 4 and 5 are positioned as follows. The positions of the coupling lenses 4 and 5 are adjusted in the X direction so that the light beams respectively emitted by the semiconductor laser diodes 1 and 2 are changed to light beams having a given divergence. Further, the positions of the coupling lenses 4 and 5 are adjusted in the Y and Z directions so that the light beams travel in the given beam emitting directions. A light source 6 is formed by the semiconductor laser diodes 1 and 2, the base member 3, and the coupling lenses 4 and 5.

Figure 2:
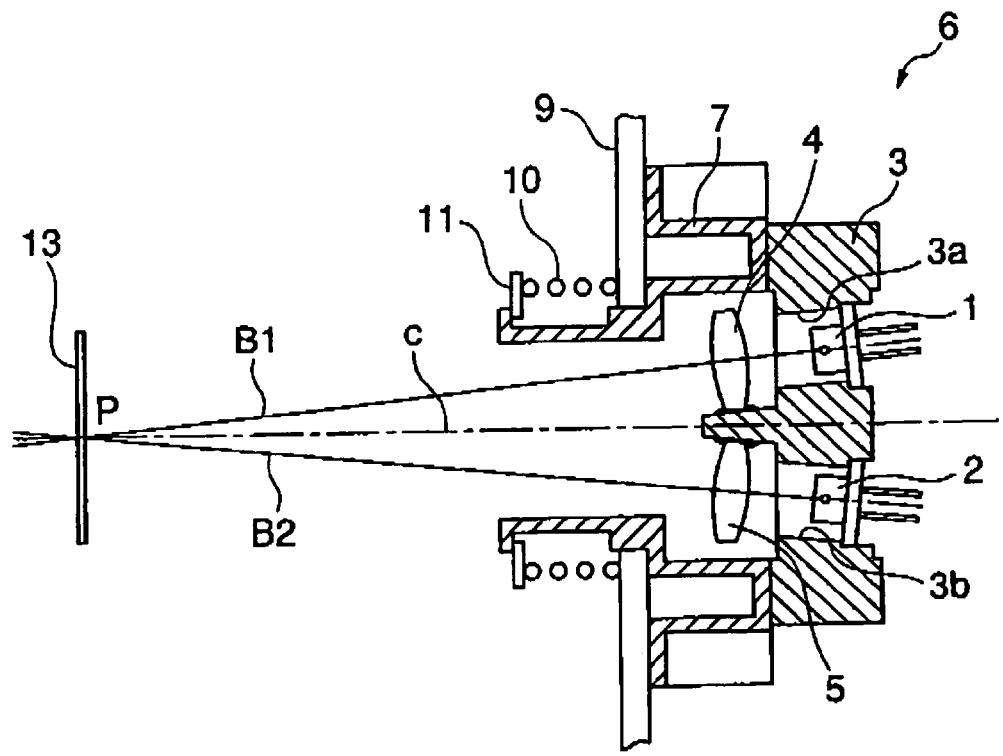
FIG. 2 is a cross-sectional view taken along a main scan direction.

As shown in FIG. 2, the fitting holes 3a and 3b are formed so as to have a given angle with respect to an optical axis C, and the coupling lenses 4 and 5 are arranged so that the axes thereof are inclined at the given angle.

The embodiment of the present invention shown in FIGS. 1 and 2 have: the fitting holes 3a and 3b that are inclined. Alternatively, it is possible to position the coupling lenses 4 and 5 in an eccentric fashion with respect to the axes of the semiconductor laser diodes 1 and 2 rather than tilting the fitting holes 3a and 3b.

The base member 3 is fixed to a holding member 7 by screws 8. A hollow cylindrical member 7a of the holding member 7 is fitted into a fitting hole 9a formed in a sidewall 9 formed in an optical housing so that the axis of the holding member 7 aligns with that of the sidewall 9 of the optical housing. A spring 10 is provided around another cylindrical portion of the holding member 7 extending from the hollow cylindrical portion 7a. A ring-shaped press member 11 is engaged with flange portions 7b of the holding member 7, so that the spring 10 is sandwiched between the sidewall 9 and the ring-shaped press member 11. A bent portion 10a of the spring extending along the optical axis is engaged with a hole 11a formed in the press member 11. An arm portion 10b of the spring 10 is engaged with a projection 9b of the sidewall 9. Thus, the spring 10 generates a clockwise torsion. A rotary movement blocking protrusion 7c formed in the holding member 7 is brought into contact with an adjustment screw 12, which accomplishes a rotational adjustment about the optical axis. The adjustment screw 12 is held by a screw (not shown) formed in the sidewall 9.

Figure 3:
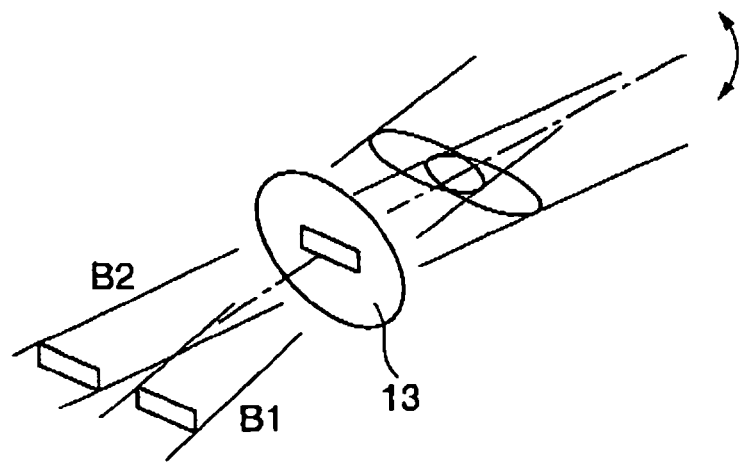
FIG. 3 is a perspective view of light beam shaping by an aperture.

The two light beams B1 and B2 respectively emitted by the light source 6 thus configured pass through an aperture 13 shown in FIG. 3. The aperture 13 is located at a crossing position P at which the light beams B1 and B2 cross. The aperture 13 functions as means for restricting the spot sizes of the light beams B1 and B2. More particularly, the aperture 13 shapes the light beams B1 and B2 so as to have a given spot shape of a predetermined size. Preferably, the aperture 13 is located in the optical path starting with the light source 6 and ending with the polygonal mirror, and is located close to the polygonal mirror.

A description will be given of a formation in which the light beams B1 and B2 are crossed on the reflection (deflection) surfaces of the polygonal mirror, which acts as a beam deflecting means. FIG. 4 shows a structure of the multibeam scanning apparatus using the light source 6 shown in FIG. 1. The formation shown in FIG. 4 is arranged so that the light beams B1 and B2 emitted by the semiconductor laser diodes 1 and 2 cross each other on reflection surfaces 14a of the polygonal mirror 14 and the size of each reflection surface 14a is set equal to the size of the aperture 13. The polygonal mirror 14 shown in FIG. 4 has 10 reflection surfaces.

The light beams B1 and B2 emitted through the coupling lenses 4 and 5 of the light source 6 pass through a cylindrical lens 15, and is then reflected by a mirror 16, so that the light beams B1 and B2 travel in an oblique, upward direction. At that time, the light beams B1 and B2 emitted by the light source 6 are changed to divergence beams or fluxes. Thus, as shown in FIG. 5A, the cross sections or spots of the light beams B are made larger than the size M of each reflection surface of the polygonal mirror 14. Thus, light beams B1' and B2' traveling from the polygonal mirror 14 are shaped into rectangular spots having a given size.

Spot images of the light beams B1' and B2' are formed, as spots of beams B1" and B2" having a given size, on a photosensitive member 20 which is a scanned surface via a scan lens 17, a mirror 18 and a scan lens 19. As shown in FIG. 4, an interval P between adjacent scan lines formed by the beams B1" and B2" (a sub scan pitch) can be adjusted so as to be equal to the interline pitch in the recording density by controlling angle θ of rotary movement round the optical axis. The two lines formed by the beams B1" and B2" simultaneously scan the photosensitive member 18.

Figure 6A:
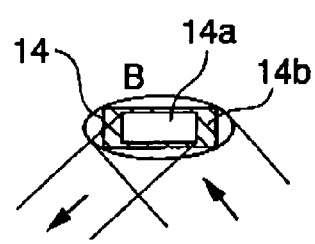
FIGS. 6A and 6B are diagrams of a variation of the arrangement shown in FIGS. 5A and 5B.
Figure 6B:
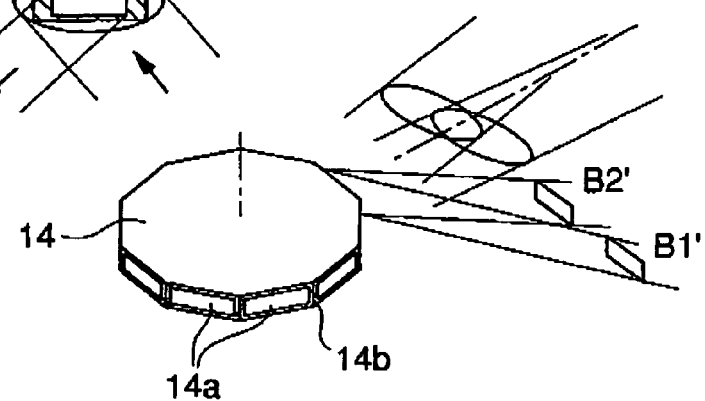

FIGS. 6A and 6B show a variation of the first embodiment of the present invention. In the variation, each surface of the polygonal mirror 14 includes a reflection surface 14a that is smaller than each surface. In other words, the edges of the reflection surface 14a are shorter than those of each surface of the polygonal mirror 14. The remaining portion of each surface of the polygonal mirror 14 is a step-like portion 14b, which may be formed by rounding. The step-like portion 14b has a comparatively low reflection rate and a comparatively rough surface. Alternatively, the reflection surface 14 may be formed by bonding a mask or may be formed by an evaporation process in which only a reflection surface expected area is subjected to evaporation.

Figure 7:
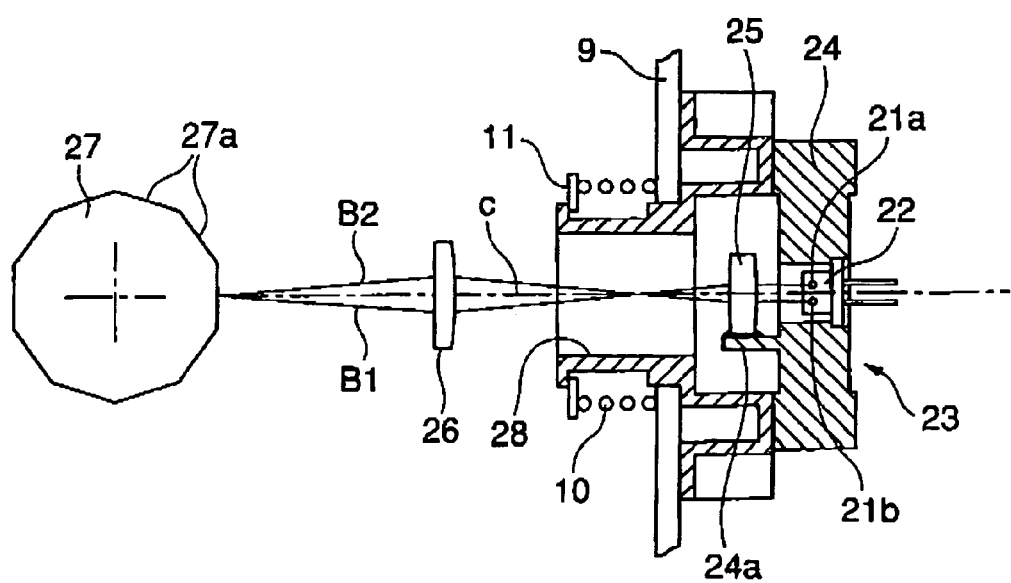
FIG. 7 is a cross-sectional view of a light source according to a second embodiment of the present invention.

A description will now be given, with reference to FIG. 7, of a second embodiment of the present invention, which includes a light source 23 having a semiconductor laser diode array 22 in which two light-emitting sources 21a and 21b are formed in a monolithic fashion. FIG. 7 is a cross-sectional view of the light source 23 taken along the main scan direction Y. Parts that are the same as those shown in the previously described figures are given the same reference numbers.

The semiconductor laser diode array 22 is inserted, with a pressure, into a fitting hole 24a formed on the back side of a base member 24 made of aluminum die-cast so that the light-emitting sources 21a and 21b are arranged in the main scan direction Y. The light-emitting sources 21a and 21b have a size of approximately 100 μm. A Coupling lens 25 is fixed to a supporting portion 24a by UV hardening resin, and is positioned as follows. That is, the coupling lens 25 is positioned in the X direction so that the light beams emitted by the light-emitting sources 21a and 21b are changed to light beams having a given divergence. The coupling lens 25 is positioned in the Y and Z directions so that the light-emitting sources 21a and 21b are positioned symmetrically with respect to the optical axes of the coupling lens 25.

The light beams passing through the coupling lens 25 travel in an eccentric fashion in which the light beams do not travel on the optical axis C. Thus, the light beams cross each other at the focal position of the coupling lens 25, and then diverge therefrom. A convergent lens 26 causes the diverging beams to cross each other again on each reflection surface 27a of a polygonal mirror 27.

The size of the light beams obtained at the second crossing position is made larger than the size of each reflection surface 27a of the polygonal mirror 27 in order to cause the light beams reflected by the polygonal mirror 27 to have a given size, as in the case of the first embodiment of the present invention. The base member 24 is fixed to the holding member 28 by means of screws, so that the pitch adjustment is implemented by adjustment of rotary movement round the optical axis.

Figure 8:
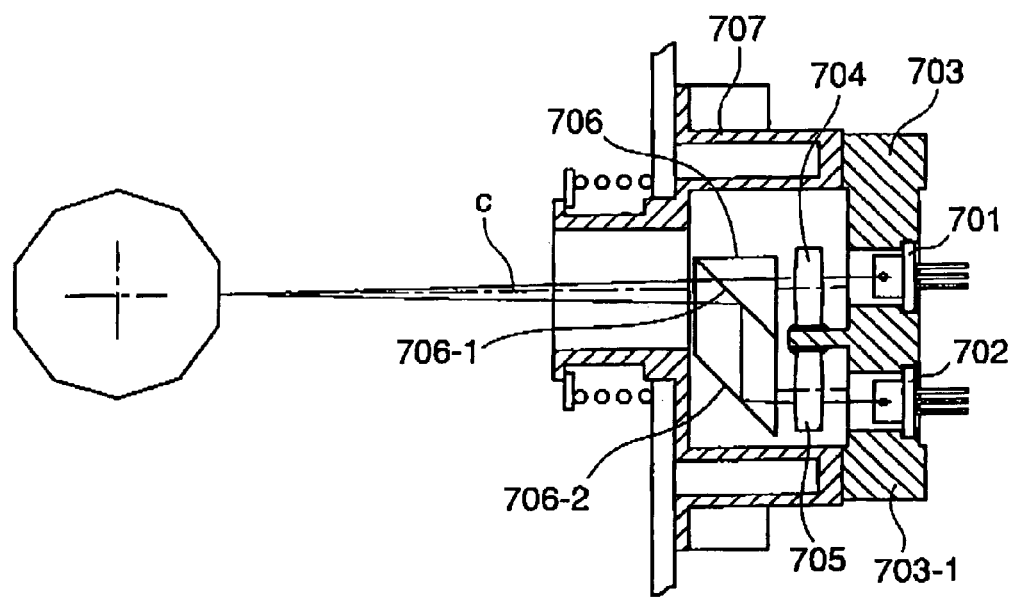
FIG. 8 is a cross-sectional view of a light source according to a third embodiment of the present invention.

A description will be given, with reference to FIG. 8, of a third embodiment of the present invention. FIG. 8 is a cross-sectional view of a light source of a multibeam scanning apparatus taken along the main scan direction Y. The light source includes two semiconductor laser diodes 701 and 702, which are inserted, with a pressure, into fitting holes formed on the back side of a base member 703 made of aluminum die-cast and arranged side by side in the main scan direction Y. Two coupling lenses 704 and 705 are fixed to opposing surfaces of a projection 703-1 serving as a support member by UV hardening resin. The coupling lenses 704 and 705 are positioned in the X direction so that the light beams emitted by the laser diodes 701 and 702 are changed to light beams having a given divergence. Further, the coupling lenses 704 and 705 are positioned in the Y and Z directions so that the light beams travel in predetermined directions.

The coupling lenses 704 and 705 are positioned in an eccentric fashion with respect to the optical axis C in the main scan direction, so that the light beams go out of the coupling lenses 704 and 705 at given angles.

The outgoing beam of the laser diode 701 passes through a beam combining unit 706, which is made up of a triangular prism and a parallelogram prism, these prisms being joined as shown in FIG. 8. The outgoing beam of the laser diode 702 is reflected by a slant surface 706-2 and a junction surface 706-1 in this order, and travels in the outgoing beam direction of the semiconductor laser diode 701. The semiconductor laser diodes 701 and 702 are positioned symmetrically with respect to the optical axis C so that they are spaced apart from each other in the main scan direction at a given equal distance. The outgoing beam directions of the semiconductor laser diodes 701 and 702 are selected so that the light beams emitted therefrom cross each other in the vicinity of the polygonal mirror.

The base member 703 is fixed to a holding member 707 by screws, and the pitch adjustment is implemented by adjustment of rotary movement round the optical axis, as has been described previously.

Figure 9:
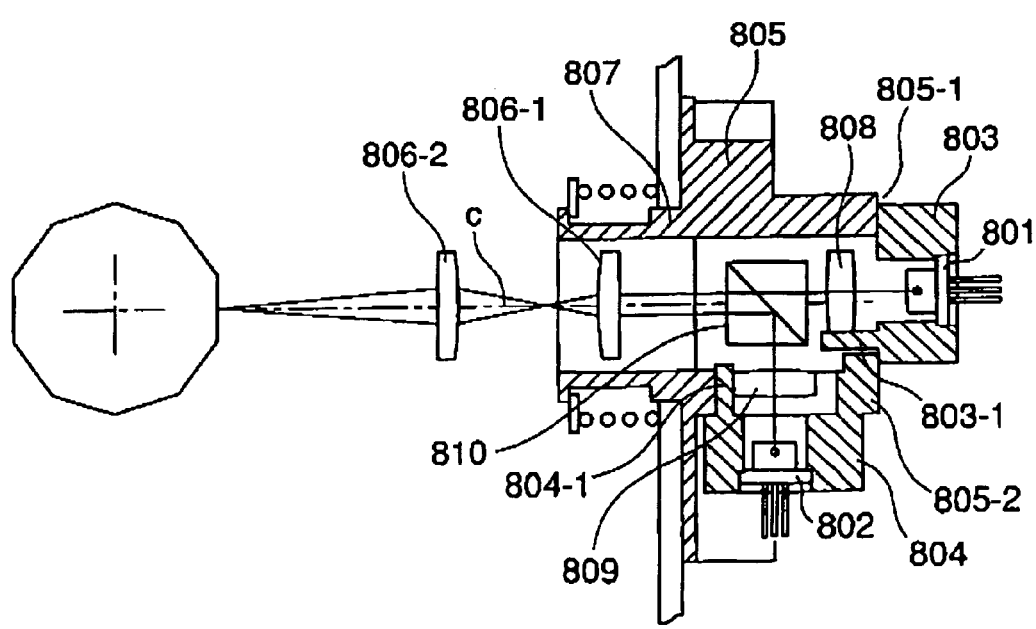
FIG. 9 is a cross-sectional view of a light source according to a fourth embodiment of the present invention.

FIG. 9 shows a fourth embodiment of the present invention in which a cubic beam splitter 810 receives light beams emitted by semiconductor laser diodes 801 and 802 in different directions which form a right angle.

The semiconductor laser diodes 801 and 802 are inserted, with a pressure, into fitting holes formed in base members 803 and 804 made of aluminum die-cast. The base members 803 and 804 are supported by attachment surfaces 805-1 and 805-2 of a flange member 805 orthogonal to each other. The flange member 805 is made of the same material as that of the base members 803 and 804. Two coupling lenses 808 and 809 are positioned in the X direction so that the outgoing beams of the semiconductor laser diodes 801 and 802 are changed to light beams having a given divergence, and are then fixed to projections 803-1 and 804-1 serving as support members by UV hardening resin. The base members 803 and 804 are positioned in the Y and Z directions so that given outgoing beam directions can be obtained, and are then fixed by screws.

The light-emitting points of the semiconductor laser diodes 801 and 802 are placed on the axes of the coupling lenses 808 and 809, and are spaced apart from each other at a given distance in the main scan direction. A convergent lens system including convergent lenses 806-1 and 806-2 causes the light beams to cross each other between the lenses 806-1 and 806-2 and further cross each other in the vicinity of the polygonal mirror. The convergent lens 806-1 is incorporated into the holding member 807, whereas the convergent lens 806-2 is provided separately from the light source.

A flange member 805 is fixed to the holding member 807 by screws, and the pitch adjustment is implemented by adjustment of rotary movement round the optical axis, as has been described previously.

The semiconductor laser diodes 801 and 802 may be disposed symmetrically with respect to the optical axis C so that they are spaced apart from each other at a given distance in the main scan direction. Instead of the crossing between the convergent lenses 806-1 and 806-2, it is possible to cross the light beams anywhere between the coupling lenses 808 and 809 and the convergent lens 806-1. The convergent lens system may consists of only one lens.

As has been described previously, there is no limitation on the number of times that the light beams cross each other. An aperture may be provided on the optical path between the light source and the polygonal mirror and may be located as close to the polygonal mirror (the reflection surfaces in the embodiments) as possible. Such an aperture makes it possible to control the relationship between the two beams and the central position. Thus, there is no possibility that the pitch adjustment may cause a deviation.

In the aforementioned embodiments of the present invention, the pitch adjustment is implemented by rotary movement of the light source. Thus, the semiconductor laser diodes, and the beam combining unit are incorporated into the light source. However, the present invention is not limited to the above structure. For example, the pitch adjustment is accomplished by a structure in which one of the two optical axes may be slightly tilted in the sub scan direction with respect to the other optical axis. The separate support will provide the same advantages.

In a synchronous detection for detecting the write initiation timings of the individual beams, only a single synchronous detection sensor can be used because the beams pass through the sensor in time series.

The present invention is not limited to applications using two beams, but includes applications using three beams or more.

According to the present invention, the outgoing beam directions of a plurality of light beams are selected so that the light beams substantially cross one another at a single point by means of the light source. Further, the light beams restricting means is provided in the vicinity of the beam crossing point. Thus, the beam crossing point is located on the optical axis (rotational axis), and the positions of the optical beams are not changed even by rotating the light source for adjustment of the sub scan pitch. In addition, the desired spot size of the light beams can be obtained without an inclination. It is therefore possible to adjust the positions of the semiconductor laser diodes and the coupling lenses with a precision lower than that required in the conventional arrangements and to produce less-expensive multibeam scanning apparatuses efficiently.

According to the present invention, a plurality of light-emitting sources of a semiconductor laser array are arranged in the main scan direction, and convergent means having at least a convergent function in the main scan direction. Further, light beam restricting means for shaping the light beams into spots of a given size is arranged in the vicinity of the crossing point at which the beams cross each other. Hence, the positions of the light beams are not changed even by rotating the light source for adjustment of the sub scan pitch. In addition, the desired spot size of the light beams can be obtained without an inclination. It is therefore possible to produce less-expensive multibeam scanning apparatuses efficiently.

According to the present invention, the polygonal mirror receives the spots of the beams having a size larger than the size of each reflection surface of the polygonal mirror. Further, each reflection surface of the polygonal mirror is formed so as to serve as light beam restricting means. Thus, the size of each reflection surface is equal to the effective size of the light beams, and each reflection surface can be reduced. This results in down sizing of the polygonal mirror and reduction in the load thereon. As a result, the polygonal mirror may rotate at a higher rate, so that a higher rate, higher recording density multibeam scanning apparatus can be provided.

According to the present invention, each reflection surface of the polygonal mirror has an edge shorter than that of each surface of the polygonal mirror. Thus, it is possible to avoid degradation of the precision in forming the surfaces resulting from an unevenness of an edge portion of the reflection surfaces and to reduce a difference in size among the reflection surfaces due to a difference in the dividing angle of the reflection surfaces and a difference in the distance from the center of rotation. Thus, the desired beam spot size can be reliably obtained, so that high quality image recording can be accomplished. Even if the spot size is reduced in the sub scan direction, a sufficient thickness of the polygon mirror can be ensured and rigidity cannot be degraded.

According to the present invention, the light beams from the light source are changed to light beams having a given divergence. Thus, even when an optical correction system is configured in which the polygonal mirror and the imaging surface have a conjugate relationship in terms of geometrical optics, it is possible to deviate the waist position of the light beams from the reflection surfaces and to thus restrict the spot sizes precisely while keeping the sufficient size of the reflection surfaces. Thus, the desired beam spots can be obtained reliably, and highly reliable image recording can be realized.

According to the present invention, a plurality of single-beam laser diodes or a laser diode array are arranged in the main scan direction, and the optical axes of the beams are controlled to directly cross each other or through optical means such as a mirror and a lens having a curvature in the main scan direction. An aperture is arranged in the vicinity of the cross point. If the beams are away from each other on the reflection surfaces of the polygonal mirror, it will be necessary to enlarge each reflection surface. However, this can be avoided when the polygonal mirror has reflection surfaces on which the function of the aperture is available (an over-field optical system).

The present invention is not limited to the specifically disclosed embodiments, and variations and modifications may be made without departing from the scope of the present invention.

What is claimed is:

1. A multibeam scan apparatus comprising:
    a light source having a semiconductor laser diode array of light-emitting sources, a coupling lens, and a base member that fixedly holds the semiconductor laser diode array and the coupling lens so as to form a unitary structure, the light-emitting sources being arranged in a main scan direction, and the base member being rotatable around an optical axis of the coupling lens so as to adjust a beam pitch;
    a convergent unit causing the light beams to converge in the main scan direction;
    a light beam restricting unit shaping the light beams so as to have a given spot size, the light beam restricting unit being positioned close to a position at which the light beams cross each other due to a function of the convergent unit;

a polygonal mirror; and a scan lens causing the light beams reflected by the polygonal mirror to form images on a scanned surface.

2. The multibeam scan apparatus as claimed in claim 1, wherein:

the light beam restricting unit is incorporated into each of reflection surfaces of the polygonal mirror; and the spot size of the light beams incident to the polygonal mirror is larger than a size of each of the reflection surfaces in at least the main scan direction.

3. The multibeam scan apparatus as claimed in claim 2, wherein each of the reflection surfaces of the polygonal mirror has an edge shorter than surfaces of the polygonal mirror in which the reflection surfaces are formed.

4. The multibeam scan apparatus as claimed in claim 1, wherein the coupling lens changes the light beams to those having a divergence.

5. A multibeam scan apparatus comprising:

a light source having a semiconductor laser diode array of light-emitting sources formed in a monolithic formation, a coupling lens, and a base member that fixedly holds the semiconductor laser diode array and the coupling lens so as to form a unitary structure, the light-emitting sources being arranged in a main scan direction, and the base member being rotatable around an optical axis of the coupling lens so as to adjust a beam pitch;

a convergent unit causing the light beams to converge in the main scan direction;

a light beam restricting unit shaping the light beams so as to have a given spot size, the light beam restricting unit being positioned close to a position at which the light beams cross each other due to a function of the convergent unit;

a deflection unit deflecting the light beams; and a scan lens causing the light beams deflected by the deflection unit to form images on a scanned surface.

6. The multibeam scan apparatus as claimed in claim 5 wherein:

the light beam restricting unit is incorporated into each of deflection surfaces of the deflection unit; and the spot size of the light beams incident to the deflection unit is larger than a size of each of the deflection surfaces in at least the main scan direction.

7. The multibeam scan apparatus as claimed in claim 6, wherein each of the deflection surfaces of the deflection unit has an edge shorter than surfaces of the deflection unit in which the deflection surfaces are formed.

8. The multibeam scan apparatus as claimed in claim 7, wherein the coupling lens changes the light beams to those having a divergence.

* * * * *